United States Patent
Oh et al.

(10) Patent No.: US 8,499,573 B2
(45) Date of Patent: Aug. 6, 2013

(54) REFRIGERATOR AND METHOD OF CONTROLLING THE SAME

(75) Inventors: Min Kyu Oh, Seoul (KR); Kyeong Yun Kim, Seoul (KR); Jang Seok Lee, Seoul (KR); Youn Seok Lee, Seoul (KR); Su Nam Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 643 days.

(21) Appl. No.: 12/547,085

(22) Filed: Aug. 25, 2009

(65) Prior Publication Data

US 2010/0126200 A1    May 27, 2010

(30) Foreign Application Priority Data

Nov. 26, 2008   (KR) .................. 10-2008-0118214

(51) Int. Cl.
*F25D 17/04*   (2006.01)
(52) U.S. Cl.
USPC .............................. 62/186; 62/441
(58) Field of Classification Search
None
See application file for complete search history.

(56) References Cited

U.S. PATENT DOCUMENTS

| | | | | |
|---|---|---|---|---|
| 3,466,891 A | * | 9/1969 | Maxwell | 62/419 |
| 5,285,655 A | * | 2/1994 | Sung-Il et al. | 62/451 |
| 5,713,215 A | * | 2/1998 | Choi | 62/455 |
| 6,820,435 B2 | * | 11/2004 | Anderson et al. | 62/202 |
| 7,181,921 B2 | * | 2/2007 | Nuiding | 62/198 |
| 2004/0168467 A1 | | 9/2004 | Nuiding | |
| 2004/0216476 A1 | | 11/2004 | Shin | |
| 2007/0113567 A1 | * | 5/2007 | Ahn et al. | 62/186 |
| 2008/0178621 A1 | * | 7/2008 | Kang | 62/179 |

FOREIGN PATENT DOCUMENTS

EP    0 541 157    5/1993

OTHER PUBLICATIONS

International Search Report and Written Opinion issued in PCT Application No. PCT/KR2009/004099 dated Oct. 6, 2010.

* cited by examiner

*Primary Examiner* — Cheryl J Tyler
*Assistant Examiner* — Lakiya Rogers
(74) *Attorney, Agent, or Firm* — KED & Associates LLP

(57) ABSTRACT

A refrigerator is provided. The refrigerator may include first and second refrigerant paths that separately distribute refrigerant, a first cooling chamber connected with a first cold air duct, a second cooling chamber connected with a second cold air duct, and a third cooling chamber connected with a third cold air duct. Cold air generated by a first evaporator is provided to the first cold air duct to cool the first cooling chamber, cold air generated by a second evaporator, which receives refrigerant from the first evaporator, is provided to the second cold air duct to provide concentrated cooling to the second cooling chamber, and cold air generated by a third evaporator is provided to the third cold air duct to cool the third cooling chamber.

16 Claims, 6 Drawing Sheets

REFRIGERATOR AND METHOD OF CONTROLLING THE SAME

CROSS REFERENCE TO RELATED APPLICATION

This application claims the benefit of Korean Patent Application No. 10-2008-0118214, filed in Korea on Nov. 26, 2008, the entirety of which is hereby incorporated herein by reference.

BACKGROUND

1. Field

A refrigerator is provided, and, more particularly, a refrigerator capable of cooling or preserving food items at low temperatures and a control method thereof are provided.

2. Background

Refrigerators are electric appliances capable of cooling or freezing food stuffs using cold air generated by a phase-change of a refrigerant, or a working fluid. Such a refrigerator may include a body having refrigerator and freezer compartments formed therein, and refrigerator compartment and freezer compartment doors rotatably coupled to the body to open and close respective front openings of the refrigerator and freezer compartments. Various components of a freezing cycle circulate refrigerant to provide for cooling of the refrigerator and freezer compartments of the refrigerator. Certain storage items would benefit from a more rapid cooling rate in at lest a section of the refrigerator and/or freezer compartments.

BRIEF DESCRIPTION OF THE DRAWINGS

The embodiments will be described in detail with reference to the following drawings in which like reference numerals refer to like elements wherein.

DETAILED DESCRIPTION

Reference will now be made in detail to specific embodiments, examples of which are illustrated in the accompanying drawings. Wherever possible, the same reference numbers will be used throughout the drawings to refer to the same or like parts.

A freezing cycle of a refrigerator may include a compressor that compresses low temperature/pressure gaseous refrigerant into a high temperature/pressure gaseous refrigerant, a condenser that condenses the refrigerant drawn from the compressor using external air, an expansion valve having a relatively narrow diameter that expands the refrigerant drawn from the condenser, and an evaporator that absorbs heat generated while the refrigerant having passed through the expansion valve is evaporated at a low pressure.

Refrigerators may be categorized into various different types, depending on the arrangement of the refrigerator and freezer compartments. For example, in a top mount type, a refrigerator or freezer compartment is mounted one on top of the other, with refrigerator and freezer doors respectively coupled to the compartments to open and close the compartments. In a side by side type, the refrigerator and freezer compartments may be provided side by side, with refrigerator and freezer compartment doors rotatably coupled to two opposite sides of the refrigerator to open and close the respective compartments.

Various kinds of convenient features, such as, for example, a home bar or a dispenser that allows a user to remove items from the refrigerator without opening the doors, may be provided in the doors.

Figure 1:
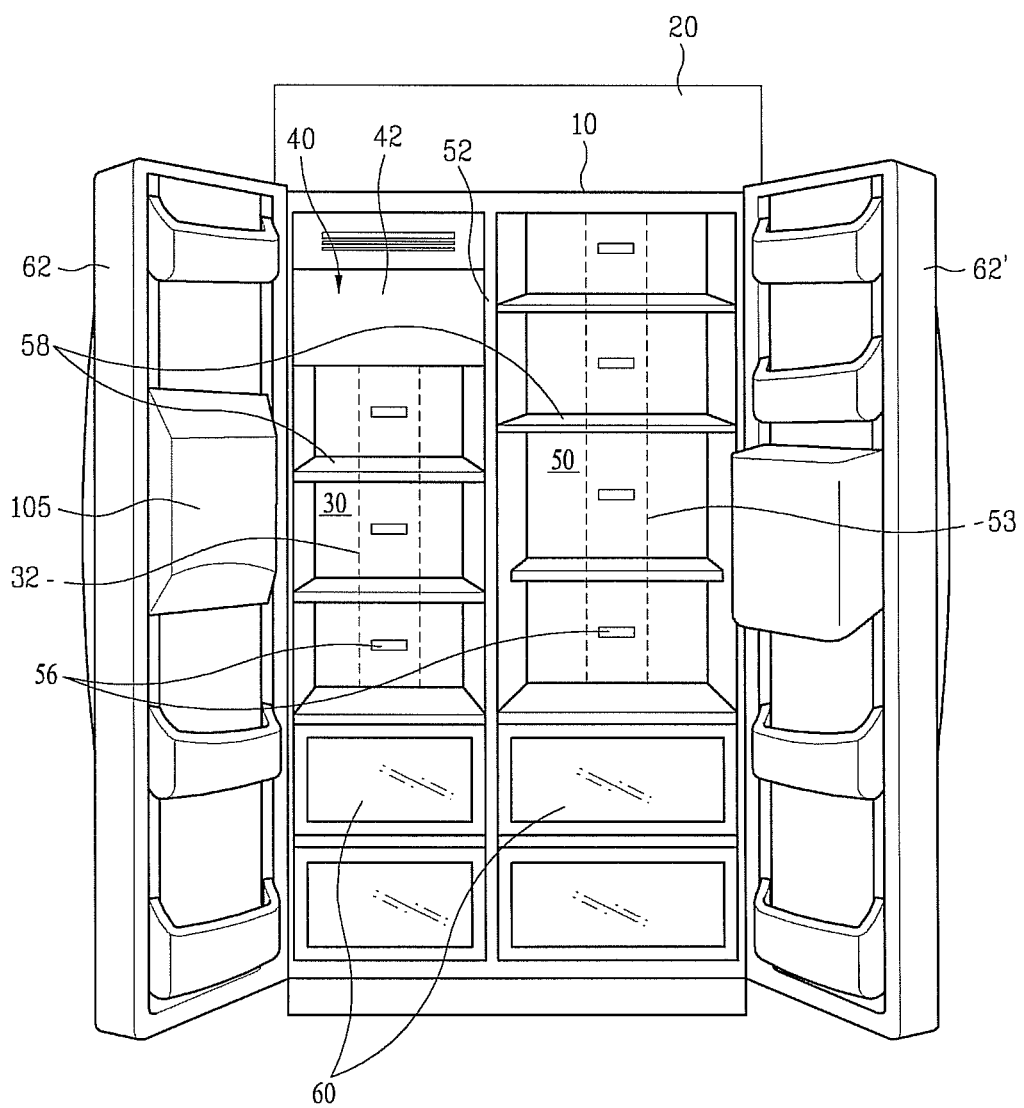
FIG. 1 is a front view of an exemplary refrigerator as embodied and broadly described herein.

The exemplary refrigerator shown in FIG. 1 may include a mechanism compartment 20 provided in a body 10 that defines an exterior appearance of the refrigerator. The mechanism compartment 20 may be provided at an upper portion of the body 10, as in the embodiment shown in FIGS. 1 and 2, at a lower portion of the body 10, or other location as appropriate. A compressor 110, a condenser 120, a fan assembly (not shown) and a cold air generation chamber 22 (see FIG. 2) may be provided in the mechanism compartment 20, and an evaporator 150 may be installed in the cold air generation chamber 22.

A storage space may be formed in the body 10 to receive and preserve food items using cold air generated near the evaporator 150. The storage space may include a first cooling chamber 30, a second cooling chamber 40 and a third cooling chamber 50. The first, second and third chambers 30, 40 and 50 may be separate from each other to each form a separate storage space. The first, second and third cooling chambers 30, 40 and 50 may include, for example, a freezer compartment, a quick freezer compartment and a refrigerator compartment. Simply for ease of discussion, a quick freezer compartment provided in the freezer compartment will be discussed hereinafter. However, it is well understood that features as broadly described herein may also be applied to a quick freezer compartment provided in another portion of the refrigerator, such as, for example, the refrigerator compartment, or to a quick cooling compartment provided in either the refrigerator compartment or the freezer compartment.

In the embodiment shown in FIG. 1, the first cooling chamber 30 may be the freezer compartment, the second cooling chamber 40 may be the quick freezer compartment, and the third cooling chamber 50 may be the refrigerator compartment. In this embodiment, the second cooling chamber 40 is formed as a separate space within the first cooling chamber 30. Other arrangements of the first, second and third cooling chambers 30, 40 and 50 may also be appropriate.

Cold air ducts 32 and 42 may be provided in the first, second and third cooling chambers 30, 40 and 50, to circulate cold air generated by the evaporator 150 into the storages spaces. Specifically, a first cold air duct 32 may communicate with the first cooling chamber 30, and a second cold air duct 42 may communicate with the second cooling chamber 40. A third cold air duct 53 may communicate with the third cooling chamber 50. Each of the cold air ducts 32 and 42 may form an independent, separate path such that cold air is not mixed.

As mentioned above, in this embodiment the second cooling chamber 40 may be used as the quick freezer compartment that intensively receives cold air generated from a second evaporator to freeze stored food items quickly. In alternative embodiments, the second cooling chamber 40 may instead be formed as a separate space within the third cooling chamber 50, or may form an auxiliary space that is separate from the first or third cooling chamber 30 or 50. Likewise, in alternative embodiments, the first cooling chamber 30 may be the refrigerator compartment, the second cooling chamber 40 may be the quick freezer compartment, and the third cooling chamber 50 may be the freezer compartment. Other arrangements may also be appropriate.

Figure 2:
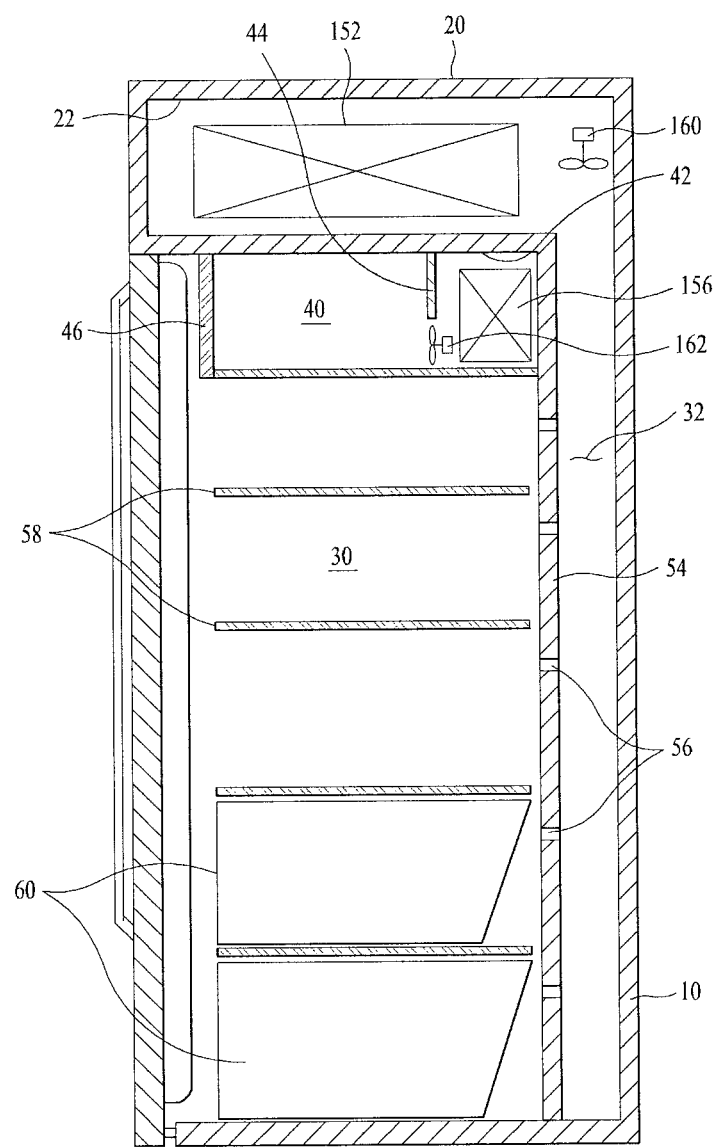
FIG. 2 is a side sectional view of the refrigerator shown in FIG. 1.

As shown in FIGS. 1 and 2, the second cooling chamber 40 occupies a relatively small space compared to the first and third chambers 30 and 50. A second evaporator 156 may be installed in the second cold air duct 42. The second cooling chamber 40 may be separated from the second cold air duct 42 by a separation wall 44. A panel 46 may be provided in the second cooling chamber 40 to selectively open and close a front opening of the second cooling chamber 40. The panel 46 may be rotatably coupled to the front of the second cooling chamber 40, and may rotate vertically or horizontally.

A partition wall 52 may be provided in the body 10 to partition the storage space into the first and third cooling chambers 30 and 50. The partition wall 52 may extend vertically from a top to a bottom of the body 10, and a heat insulation layer may be formed in the partition wall 52 as necessary.

A barrier 54 may be provided in a rear portion of the body 10 to separate the cold air ducts 32 and 42 from the storage space, and specifically, from the first, second and third cooling chambers 30, 40 and 50, such that a path is formed to guide the flow of cold air. The barrier 54 may extend vertically from the top to the bottom of the body 10. At least one cold air outlet 56 may be formed in the barrier 54 so as to discharge cold air therethrough.

A plurality of shelves 58 may be provided in the first and third cooling chambers 30 and 50. The shelves 58 partition an inner space of the first or third cooling chamber 30 or 50. Storage boxes 60 may also be provided in the first and third cooling chambers. The storage boxes 60 may slide forward and backward relative to the body 10.

Doors 62 and 62' may be rotatably coupled to the front of the body 10, in a shape corresponding to the first and third cooling chambers 30 and 50, so as to define an exterior appearance of an overall front of the refrigerator. The doors 62 and 62' may be rotatably coupled to the body so as to selectively open and close front openings of the first and third cooling chambers 30 and 50, respectively.

Figure 3:
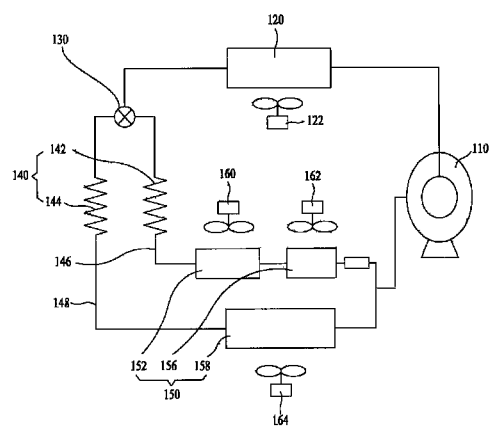
FIG. 3 is a schematic diagram of a freezing cycle of the refrigerator shown in FIG. 1.

As shown in FIG. 3, the freezing cycle may include the compressor 110, the condenser 120 and an expansion valve 140, which are installed in the mechanism compartment 20, and the evaporator 150, which is installed in the cold air generation chamber 22.

The compressor 110 compresses low temperature/pressure refrigerant gas into a high temperature/pressure refrigerant gas. The refrigerant having passed through the compressor 110 is drawn into the condenser 120. The condenser 120 performs heat-exchange of the refrigerant compressed at the compressor 110 with external air to change a phase of the refrigerant such that the high temperature/pressure refrigerant gas becomes a normal temperature high pressure refrigerant liquid. A refrigerant pipe-shaped tube of the condenser 120 may include a plurality of repeatedly bent portions. Specifically, the refrigerant tube may be bent a predetermined number of times and the bent portions may be continuously arranged at a regular interval. An overall appearance of the condenser 120 may be, for example, rectangular to accommodate the repeated bent portions of the refrigerant tube. A fan 122 may be installed adjacent to the condenser 120 to blow external air.

The refrigerant having passed through the condenser 120 is moved into the expansion valve 140 by a 3-way valve 130. The 3-way valve 130 distributes the refrigerant and may have a relatively narrow diameter so as to compress and expand the refrigerant drawn from the condenser 120. The expansion valve 140 may include a first expansion valve 142 and a second expansion valve 144. That is, the refrigerant distributed by the 3-way valve 130 may be separately supplied to either the first expansion valve 142 or the second expansion valve 140.

The first expansion valve 142 may be connected with a first refrigerant path 146 that guides the refrigerant into a first evaporator 152, and the second expansion valve 144 may be connected with a second refrigerant path 148 that guides the refrigerant into a third evaporator 158. That is, the first and second refrigerant paths 146 and 148 form separate paths along which the refrigerant is separately supplied to the evaporators 152 and 158, respectively.

The expansion valve 140 is connected with the evaporator 150, and in particular, with the first, second and third evaporators 152, 156 and 158. The evaporator 150 evaporates the refrigerant having passed through the expansion valve 140 at a low pressure and absorbs heat generated inside the refrigerator.

The evaporator 150 may include a freezer evaporator, or first evaporator 152, a second evaporator 156 and a third evaporator 158. The first and second evaporators 152 and 156 may be connected with the first refrigerant path 146. Thus, the second evaporator 156 receives refrigerant from the first evaporator, while the third evaporator 158 may be connected with the second refrigerant path 148.

The first evaporator 152 generates and supplies cold sir to the first cold air duct 32 to cool the first cooling chamber 30. The second evaporator 156 generates and supplies cold air to the second cold air duct 42 to cool the second cooling chamber 40. The third evaporator 158 generates and supplies cold air to the third cold air duct 53 to cool the third cooling chamber 50. Fans 160, 162 and 164 may be provided near the first, second and third evaporators 152, 156 and 158, respectively, to circulate and direct into the cold air ducts 32 and 42, respectively.

Figure 4:
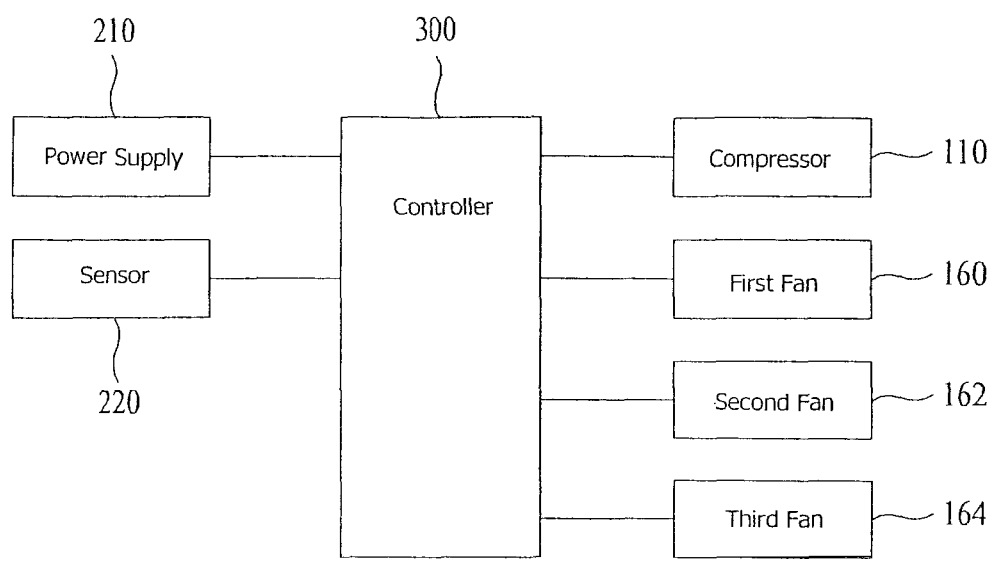
FIG. 4 is a block diagram of cooling related components of the refrigerator shown in FIG. 1.

As shown in FIG. 4, a controller 300 may control an overall operation of the refrigerator. The controller 300 may sense operational environments inside the refrigerator to control an operational state of each element. An input terminal of the controller 300 may be connected a power supply 210 that supplies power to the refrigerator and to a sensor 220 that senses temperatures of the first, second and third cooling chambers 30, 40 and 50. An output terminal of the controller 300 may be connected the compressor 110, the first fan 160, the second fan 162 and the third fan 164 to perform corresponding operations according to a control command.

Next, an operation of a refrigerator having the above configuration will be described in detail.

To initiate the freezing cycle, the low temperature/pressure refrigerant gas is changed into high temperature/pressure refrigerant gas at the compressor 110. The refrigerant having passed through the compressor 110 is heat-exchanged with external air at the condenser 120 and separately supplied to the first and second expansion valves 142 and 144 by the 3-way valve 130. The 3-way valve 130 may allow the refrigerant to be supplied to either the first or the second expansion valve 142 and 144 as appropriate.

The refrigerant having passed through the first expansion valve 142 passes through the first evaporator 152 and the second evaporator 156 sequentially along the first refrigerant path 146. During this process, cold air is generated. The cold air generated at the first evaporator 152 is directed into the first cold air duct 32 by the first fan 160, to be supplied to the first cooling chamber 30. The cold air generated at the second evaporator 156 is directed by the second fan 162 into the second cold air duct 42 to be supplied to the second cooling chamber 40. The refrigerant having passed through the second expansion valve 144 passes through the third evaporator 158 along the second refrigerant path 148. During this process, cold air is generated at the third evaporator 158. The cold air generated at the third evaporator 158 is directed into the third cold air duct 53 by the third fan 164, to be supplied to the third cooling chamber 50.

Figure 5:
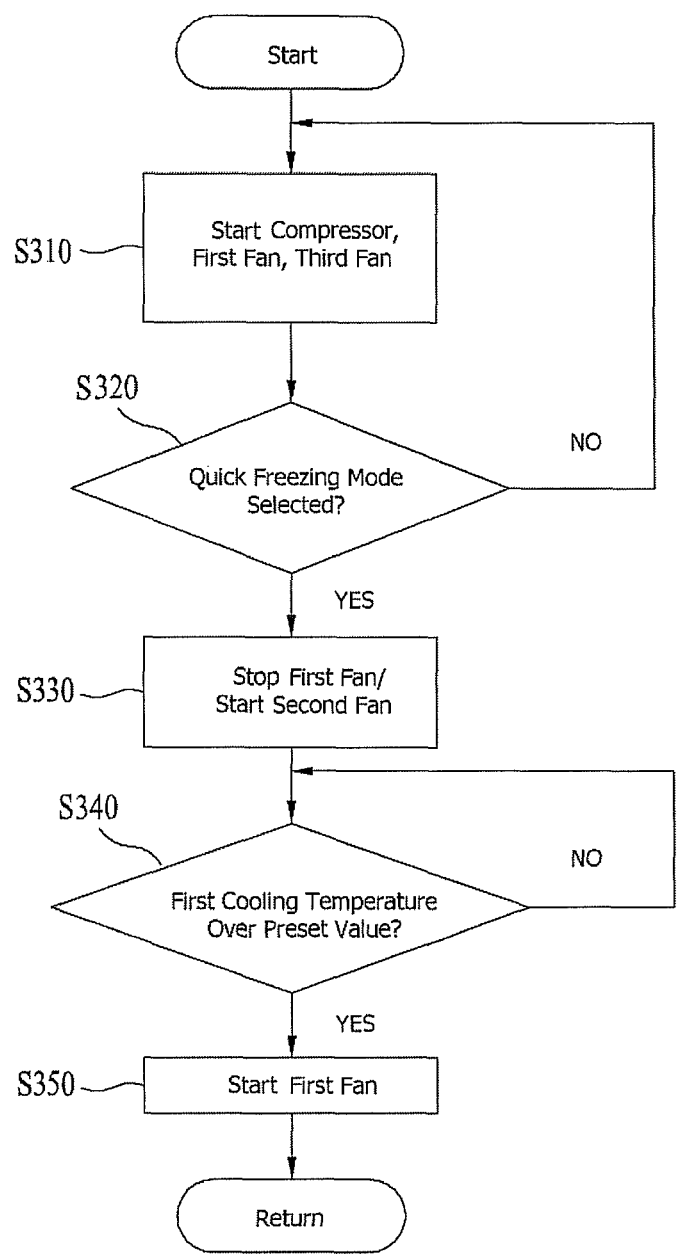
FIG. 5 is a flow chart of a quick freezing mode of a refrigerator as embodied and broadly described herein.
Figure 6:
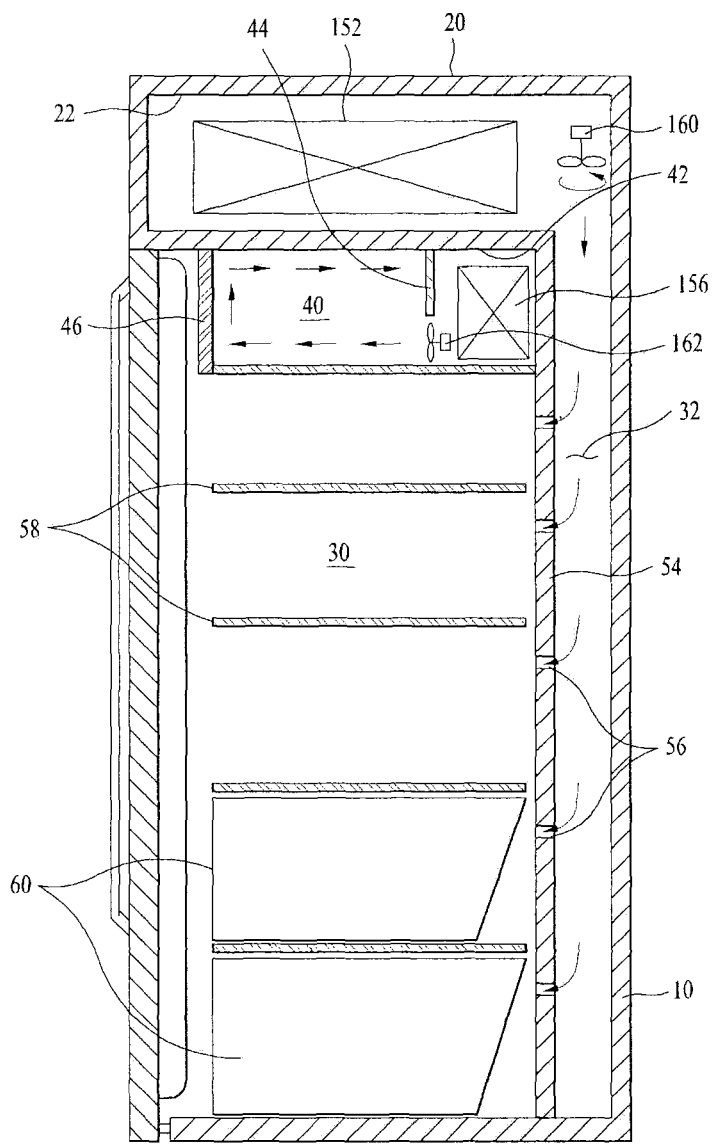
FIG. 6 is a side sectional view illustrating circulation of cold air in a refrigerator as embodied and broadly described herein.

As shown in FIG. 5, once electricity is applied, the compressor 110, the first fan 160 and third fan 164 start to operate (S310). It is then determined whether a quick freezing mode has been selected (S320). In this mode, cold air is supplied to the second cooling chamber 40 by the second evaporator 156, which is connected with the first evaporator 152 of the first cooling chamber 30.

If the quick freezing mode has been selected, cold air is supplied to the second cooling chamber 40. Specifically, the first fan 160, which guides cold air into the first cooling chamber 30, stops operating, and the second fan 162, which guides cold air into the second cooling chamber 40, starts operating (S330). That is, if the operation of the first fan 160 is stopped, cold air is not blown into the first cooling chamber 30, and the operation of the second fan 162 causes cold air generated at the second evaporator 156 to be intensively supplied to the second cooling chamber 40 for rapid cooling.

The sensor 220 provided in the first cooling chamber 30 senses the temperature of the first cooling chamber 30, and it is determined whether the temperature of the first cooling chamber exceeds a preset value (S340). If the temperature of the first cooling chamber exceeds the preset value, the first fan 160 starts to operate to provide cold air to the first cooling chamber 30 (S350). If the temperature of the first cooling chamber 30 is at or below the preset value, the first cooling chamber 30 does need additional cooling, and thus the first fan 160 is not operated until the temperature of the first cooling chamber 30 exceeds the preset value.

A refrigerator as embodied and broadly described herein has a simple structure having an evaporator provided in the quick freezer compartment. The evaporator for the quick freezer compartment uses refrigerant passing through the evaporator for the freezer or refrigerator compartment to provide high level, rapid cooling to the quick freezer compartment.

A refrigerator is provided, and more specifically, a refrigerator having a cold air duct that supplies cold air to a quick freezer compartment from an evaporator is provided.

A refrigerator as embodied and broadly described herein may include first and second refrigerant paths distributing refrigerant having passed a condenser; a first cooling chamber connected with a first cold air duct through which cold air generated by a first evaporator is circulated; a second cooling chamber connected with a second cold air duct through which cold air generated by a second evaporator receiving the refrigerant from the first evaporator is circulated; and a third cooling chamber connected with a third cold air duct through which cold air generated by a third evaporator connected with a second refrigerant path is circulated.

The first, second and third cold air ducts may be separated from each other to prevent the circulated cold air from being mixed and a fan may be provided in each of the first, second and third cold air ducts.

The refrigerant having passed the condenser may be distributed into the first and second refrigerant paths by a 3-way valve.

The 3-way valve may adjust the amount of the refrigerant distributed into the first and second refrigerant valves.

A fan provided in the first cold air duct may stop to operate, in case of cooling the second cooling chamber in a state of the temperature of the first cooling chamber being below a preset value.

Fans provided in the first and second cold air ducts, respectively, may start to operate, in case of cooling the second cooling chamber in a state of the temperature of the first cooling chamber being over a preset value.

The first cooling chamber may be a freezer compartment or a refrigerator compartment and the second cooling chamber may be a quick freezer compartment.

The first cooling chamber may be a quick freezer compartment and the second cooling chamber may be a freezer compartment or a refrigerator compartment.

In another embodiment as broadly described herein, a method of controlling a refrigerator may include determining whether a quick freezing mode supplying cold air to a second cooling chamber is selected, the cold air generated by an second evaporator connected with a first evaporator of a first cooling chamber; and supplying the cold air to the second cooling chamber if it is determined that the quick freezing mode is selected.

Supplying the cold air to the second cooling chamber may include stopping to operate a first fan guiding the cold air to the first cooling chamber; and starting to operate a second fan guiding the cold air to the second cooling chamber.

The control method may also include controlling a sensing part provided in the first cooling chamber to sense the temperature of the first cooling chamber and to determine whether the temperature of the first cooling chamber is over a preset value; and starting to operate the first fan if it is determined that the temperature of the first cooling chamber is over the preset value.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, numerous variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:
1. A refrigerator, comprising:
a main body having first, second and third chambers fanned therein; and
first and second refrigerant paths connected in parallel to a condenser, wherein the first and second refrigerant paths receive refrigerant from a condenser and supply condensed refrigerant to first, second and third evaporators, wherein the first evaporator is provided in the first refrigerant path and is connected with a first duct, the first evaporator receiving refrigerant from the condenser via the first refrigerant path, generating cold air using the received refrigerant, and supplying the generated cold air to the first chamber through the first duct;

the second evaporator is provided in the first refrigerant path, downstream of the first evaporator, and is connected in series with the first evaporator such that the second evaporator only receives refrigerant that has already passed through the first evaporator, generates cold air using only the refrigerant received from the first evaporator, and supplies the generated cold air to the second chamber through a second duct; and the third evaporator is provided in the second refrigerant path and is connected with a third duct, the third evaporator receiving refrigerant from the condenser via the second refrigerant path, generating cold air using the received refrigerant, and supplying the generated cold air to the third chamber through the third duct;

wherein the first and second refrigerant paths form separate paths that separately guide refrigerant, the first refrigerant path guiding refrigerant to the first evaporator and the first evaporator guiding the refrigerant to the second evaporator along the first refrigerant path, and the second refrigerant path guiding refrigerant to the third evaporator, to prevent mixture of refrigerant circulating through the first refrigerant path with refrigerant circulating through the second refrigerant path.

2. The refrigerator of claim 1, further comprising first, second and third fans respectively provided in the first, second and third ducts so as to circulate cold air therein, wherein the first, second and third ducts are separated from each other so as to prevent mixture of cold air circulated therein.

3. The refrigerator of claim 2, further comprising a three way valve connected to an outlet end of the condenser, wherein the three way valve distributes refrigerant processed by the condenser into the first and second refrigerant paths.

4. The refrigerator of claim 3, wherein the three way valve adjusts an amount of refrigerant supplied to the first and second refrigerant paths based on an amount of temperature change required in the first, second and third chambers.

5. The refrigerator of claim 4, wherein the first fan is configured to stop operating when a temperature of the first chamber is less than a preset first chamber temperature.

6. The refrigerator of claim 4, wherein the first and second fans are configured to start operating when a temperature in the second chamber is greater than a preset second chamber temperature.

7. The refrigerator of claim 1, wherein the first, second and third chambers are a quick freezer compartment, a main freezer compartment and a refrigerator compartment, and wherein the quick freezer compartment is formed as a separate sub-compartment within the main freezer compartment or the refrigerator compartment.

8. The refrigerator of claim 7, wherein a temperature of the quick freezer compartment is decreased more quickly than a temperature of the main freezer compartment in a quick freezing mode of the refrigerator.

9. A refrigerator, comprising:
a main body having first, second and third chambers formed therein;
first, second and third evaporators in communication with the first, second and third chambers so as to provide cold air to the first, second and third chambers, respectively;
a first refrigerant path that receives condensed refrigerant from a condenser and supplies the condensed refrigerant to the first evaporator, wherein the first evaporator supplies the condensed refrigerant to the second evaporator, the second evaporator being connected to the first evaporator in series and positioned downstream of the first evaporator, such that the second evaporator only receives refrigerant that has already passed through the first evaporator;
a second refrigerant path that receives condensed refrigerant from the condenser and supplies the condensed refrigerant to the third evaporator, the first and second refrigerant paths being connected in parallel with the condenser; and
separate first, second and third ducts that respectively receive cold air from the first, second and third evaporators, and that respectively supply the received cold air to the first, second and third chambers,
wherein the first and second refrigerant paths form paths that separately guide refrigerant, the first refrigerant path guiding refrigerant to the first evaporator and the first evaporator guiding the refrigerant to the second evaporator along the first refrigerant path and the second refrigerant path guiding refrigerant to the third evaporator, to prevent mixture of refrigerant circulating through the first refrigerant path with refrigerant circulating through the second refrigerant path.

10. The refrigerator of claim 9, further comprising first, second and third fans respectively provided in the first, second and third ducts so as to circulate cold air therein.

11. The refrigerator of claim 9, further comprising a three way valve connected to an outlet end of the condenser, wherein the three way valve distributes refrigerant processed by the condenser into the first and second refrigerant paths.

12. The refrigerator of claim 11, wherein the three way valve adjusts an amount of refrigerant supplied to the first and second refrigerant paths based on an amount of temperature change required in the first, second and third chambers.

13. The refrigerator of claim 12, wherein the first fan is configured to stop operating when a temperature of the first chamber is less than a preset first chamber temperature.

14. The refrigerator of claim 12, wherein the first and second fans are configured to start operating when a temperature in the second chamber is greater than a preset second chamber temperature.

15. The refrigerator of claim 9, wherein the first, second and third chambers are a quick freezer compartment, a main freezer compartment and a refrigerator compartment, and wherein the quick freezer compartment is formed as a separate sub-compartment within the main freezer compartment or the refrigerator compartment.

16. The refrigerator of claim 15, wherein a temperature of the quick freezer compartment is decreased more quickly than a temperature of the main freezer compartment in a quick freezing mode of the refrigerator.

* * * * *